US010796133B2

(12) United States Patent
Wen

(10) Patent No.: US 10,796,133 B2
(45) Date of Patent: Oct. 6, 2020

(54) IMAGE PROCESSING METHOD AND APPARATUS, AND ELECTRONIC DEVICE

(71) Applicant: GUANGDONG OPPO MOBILE TELECOMMUNICATIONS CORP., LTD., Dongguan, Guangdong (CN)

(72) Inventor: Zhaoyan Wen, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 145 days.

(21) Appl. No.: 16/131,169

(22) Filed: Sep. 14, 2018

(65) Prior Publication Data
US 2019/0156108 A1    May 23, 2019

(30) Foreign Application Priority Data

Nov. 21, 2017   (CN) .......................... 2017 1 1163395

(51) Int. Cl.
*G06K 9/00* (2006.01)
*G06F 16/583* (2019.01)
(Continued)

(52) U.S. Cl.
CPC ......... *G06K 9/00288* (2013.01); *G06F 16/51* (2019.01); *G06F 16/583* (2019.01);
(Continued)

(58) Field of Classification Search
CPC ............ G06K 9/0054; G06K 9/00677; G06K 9/00295; G06K 9/00281; G06K 9/00248;
(Continued)

(56) References Cited

U.S. PATENT DOCUMENTS

2006/0245639 A1* 11/2006 Jiang ................. G06K 9/00208
                                                          382/154
2008/0019661 A1*  1/2008 Obrador .............. G11B 27/034
                                                          386/210
(Continued)

FOREIGN PATENT DOCUMENTS

CN          103377272          10/2013
CN          104820675           8/2015
(Continued)

OTHER PUBLICATIONS

EPO, Office Action for EP Application No. 18195150, dated Apr. 18, 2019.
(Continued)

Primary Examiner — Ali Bayat
(74) Attorney, Agent, or Firm — Hodgson Russ LLP

(57) ABSTRACT

Embodiments of the present disclosure relate to an image processing method and apparatus, and an electronic device. The method includes: acquiring a photo album obtained from face clustering; collecting face information of respective images in the photo album, and acquiring a face parameter of each image according to the face information; selecting a cover image according to the face parameter of each image; and taking a face-region image from the cover image, and setting the face-region image as a cover of the photo album.

16 Claims, 5 Drawing Sheets

(51) Int. Cl.
- *G06T 7/50* (2017.01)
- *G06T 7/73* (2017.01)
- *G06F 16/51* (2019.01)
- *G06K 9/20* (2006.01)

(52) U.S. Cl.
CPC ..... *G06F 16/5838* (2019.01); *G06K 9/00228* (2013.01); *G06K 9/00248* (2013.01); *G06K 9/00281* (2013.01); *G06K 9/00295* (2013.01); *G06K 9/00677* (2013.01); *G06K 9/2054* (2013.01); *G06T 7/50* (2017.01); *G06T 7/73* (2017.01); *G06T 2207/30201* (2013.01); *G06T 2207/30242* (2013.01)

(58) Field of Classification Search
CPC .. G06K 9/00288; G06K 9/00228; G06T 7/50; G06T 7/73; G06T 2207/30201; G06T 2207/30242
USPC .......................................................... 382/118
See application file for complete search history.

(56) References Cited

U.S. PATENT DOCUMENTS

| | | | |
|---|---|---|---|
| 2011/0205399 A1 | 8/2011 | Gao et al. | |
| 2014/0201126 A1* | 7/2014 | Zadeh | A61B 5/4803 706/52 |
| 2014/0210830 A1* | 7/2014 | Latorre-Martinez | G10L 21/10 345/473 |
| 2014/0210831 A1* | 7/2014 | Stenger | G06T 13/40 345/474 |
| 2014/0348398 A1 | 11/2014 | Irimoto | |
| 2015/0042662 A1* | 2/2015 | Latorre-Martinez | G06T 13/80 345/473 |
| 2015/0052084 A1* | 2/2015 | Kolluru | G06F 16/90335 706/11 |
| 2015/0169945 A1* | 6/2015 | Connell, II | G06K 9/00248 382/118 |
| 2020/0097703 A1* | 3/2020 | Ptucha | G06K 9/00362 |

FOREIGN PATENT DOCUMENTS

| | | | | |
|---|---|---|---|---|
| CN | 105138962 | 12/2015 | | |
| CN | 105404863 | 3/2016 | | |
| CN | 106021405 | 10/2016 | | |
| CN | 107977674 | 5/2018 | | |
| EP | 3125158 | 2/2017 | | |
| EP | 3125158 A2 * | 2/2017 | ......... | H04N 1/40012 |
| JP | 2006295890 | 10/2006 | | |

OTHER PUBLICATIONS

WIPO, English Translation of ISR/WO for PCT/CN2018/106200, dated Dec. 4, 2018.

EPO, Office Action for EP Application No. 18195150.0, dated Sep. 6, 2019.

* cited by examiner

IMAGE PROCESSING METHOD AND APPARATUS, AND ELECTRONIC DEVICE

CROSS-REFERENCE TO RELATED APPLICATIONS

This application is based on and claims priority of Chinese Patent Application No. 201711163395.7, filed on Nov. 21, 2017, the entire contents of which are incorporated herein by reference.

FIELD

The present disclosure relates to a computer technology field, and more particularly to an image processing method, an image processing apparatus, and an electronic device.

BACKGROUND

With the rapid development of internet technologies, a user may store a lot of pictures in an electronic device, and may classify the pictures stored in the electronic device. The electronic device may display the classified pictures in a form of photo albums, i.e., display the pictures of a same class in one photo album, which is convenient for the user to view them.

DISCLOSURE

An image processing method includes: acquiring a photo album obtained from face clustering; collecting face information of respective images in the photo album, and acquiring a face parameter of each image according to the face information; selecting a cover image according to the face parameter of each image; and taking a face-region image from the cover image, and setting the face-region image as a cover of the photo album.

An image processing apparatus includes: a photo album acquiring module, configured to acquire a photo album obtained from face clustering; a face information collecting module, configured to collect face information of each image in the photo album; a parameter acquiring module, configured to acquire a face parameter of each image according to the face information; a cover selecting module, configured to select a cover image according to the face parameter of each image; and a setting module, configured to take a face-region image from the cover image, and set the face-region image as a cover of the photo album.

An electronic device includes a processor and a memory, in which the memory is stored with computer programs that, when executed by the processor, cause the processor to implement the method described above.

A computer readable storage medium has computer programs stored thereon that, when executed by a processor, implement the method described above.

EMBODIMENTS OF THE PRESENT DISCLOSURE

In order to make objectives, technical solutions and advantages of the present disclosure more clear, illustration will be made below with reference to drawings and embodiments. It should be understood that, specific embodiments described herein are merely used to explain the present disclosure, but are not used to limit the present disclosure.

It is to be understood that, terms such as "first" and "second" used in the present disclosure may be used to describe various elements, but these elements are not limited by these terms. These terms are merely used to distinguish one element with another element. For example, without departing from the scope of the present disclosure, a first terminal may be referred to as a second terminal, and similarly, the second terminal may be referred to as the first terminal. Both the first terminal and the second terminal are terminals, but are not the same one.

Figure 1:
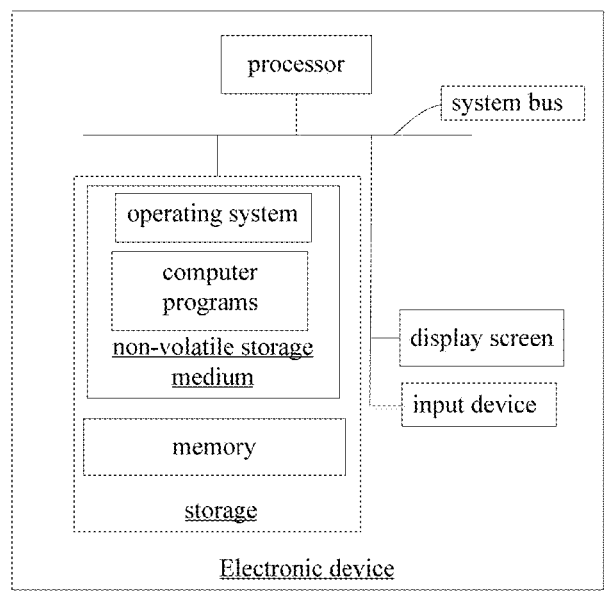
FIG. 1 is a block diagram of an electronic device in an embodiment.

FIG. 1 is a block diagram of an electronic device in an embodiment. As illustrated in FIG. 1, the electronic device includes a processor, a storage, a display screen and an input device connected via a system bus. The storage may include a non-volatile storage medium and a memory. The non-volatile storage medium of the electronic device is stored with the operating system and computer programs that, when executed by the processor, implement any image processing method provided by embodiments of the present disclosure. The processor is configured to provide computing and control capability, supporting work of the electronic device. The memory of the electronic device provides environment for running of computer programs in the non-volatile storage medium. The display screen of the electronic device may be a liquid crystal display or an E-ink screen or any other screen. The input device may be a touch layer covered on the display screen, or may be a button, a trackball or a touch panel disposed on a housing of the electronic device, or may be an external keyboard, touch panel or mouse, etc. The electronic device may be a mobile phone, a tablet PC, a PDA or a wearable device. Those skilled in the art will understand, FIG. 1 merely illustrates a part of the electronic device relevant to the present disclosure, which does not constitute limitation to the electronic device to which technical solutions of the present disclosure are applied. The electronic device may include more or less components than illustrated in the drawings, or may combine some components, or may have different component arrangements.

Figure 2:
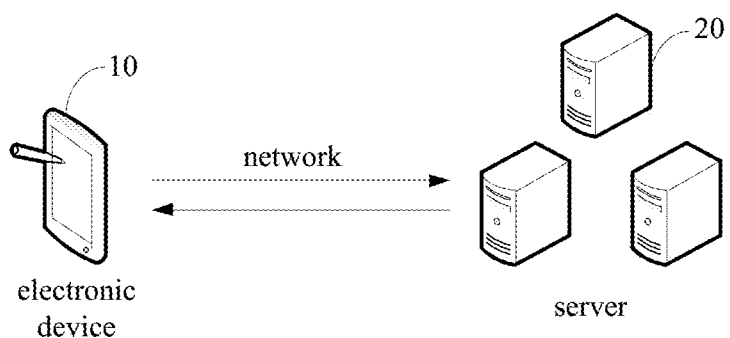
FIG. 2 is a schematic diagram of an application scenario in which an image processing method is applied, in an embodiment.

FIG. 2 illustrates an application scenario in which the image processing method is applied. As illustrated in FIG. 2, the electronic device 10 may establish communication connection with a server 20 via network. The server 20 may be a single server, or a server cluster consisting of a plurality of servers, or one server in the server cluster. In an embodiment, the electronic device 10 may acquire a photo album obtained from face clustering, collect face information of respective images in the photo album and acquire a face parameter of each image according to the face information. The electronic device 10 may select a cover image according to the parameter of each image, take a face-region image from the cover image, and set and the face-region image as a cover of the photo album. In an embodiment, the electronic device 10 may also send a cover selecting request to the server 20, in which the cover selecting request may include a group identification corresponding to the photo album. The server 20 may receive the cover selecting request, acquire image identifications included in the photo album according to the group identification in the cover selecting request, and collect the face information of respective images according to the image identifications. The server 20 may acquire the face parameter of each image according to the face information, and select the cover image according to the face parameter of each image. The server 20 may acquire the cover image from a database according to the image identification of the selected cover image, and take the face-region image from the cover image. The server 20 may return the face-region image to the electronic device 10, and the electronic device 10 may set the received face-region image as the cover of the photo album.

Figure 3:
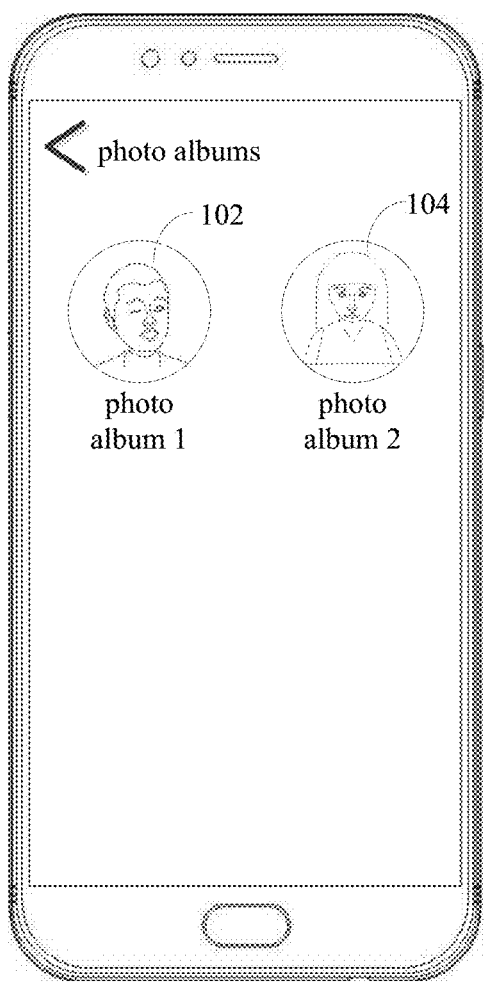
FIG. 3 is a schematic diagram of an interface displaying photo albums and covers in an embodiment.

FIG. 3 illustrates an interface displaying photo albums and covers in an embodiment. As illustrated in FIG. 3, the electronic device may display one or more photo albums on the screen, and the photo album displayed may be generated by face clustering. In this embodiment, the displayed photo albums include the photo album 1 and the photo album 2, each including images of one face, and the cover of the photo album including the corresponding face. The cover of the photo album 1 is the face image 102, which indicates that the images in the photo album 1 include faces same as or similar to the face image 102. The cover of the photo album 2 is the face image 104, which indicates that the images in the photo album 2 include faces same as or similar to the face image 104. With the cover displayed on the photo album, the user may visually know the face corresponding to the photo album.

Figure 4:
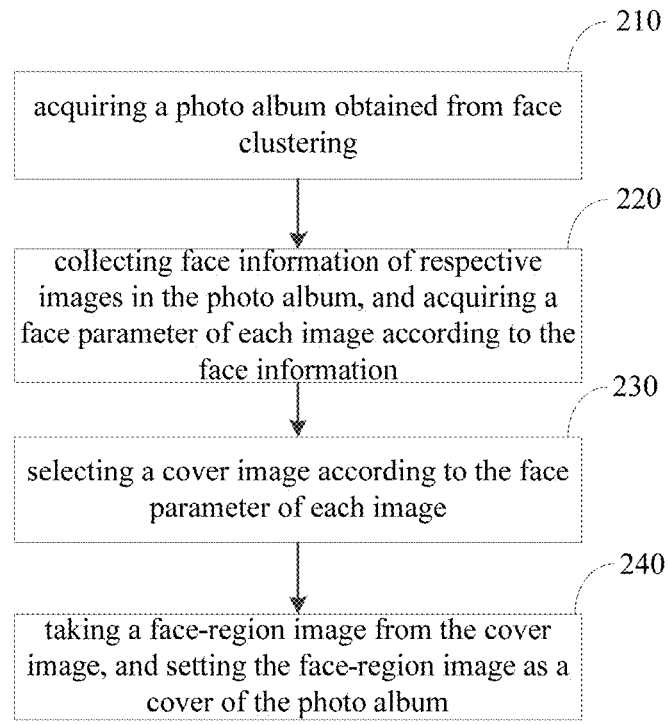
FIG. 4 is a flow chart of an image processing method in an embodiment.

In an embodiment, an image processing method is provided. As illustrated in FIG. 4, the method may include followings.

In block 210, the photo album obtained from face clustering is acquired.

The electronic device may acquire the photo album obtained from face clustering. The photo album may include at least one image, and the images included in the photo album may have same or similar faces. In one embodiment, the electronic device may cluster stored images, and divide the images with similar image features into the same group. The electronic device may acquire the images to be clustered, in which, the images to be clustered may be images shot by the electronic device, and may also be images acquired from another computer device, for example, images sent by another electronic device, and may also be images saved by the user when browsing webpages on the electronic device. The electronic device may perform face recognition on the images to be clustered, to extract image features of the images to be clustered. The image features may include but not limited to, a shape feature, a space feature and an edge feature. The shape feature refers to a shape of a portion in the image to be clustered. The space feature refers to a mutual space position or a relative direction among multiple regions divided from the image to be clustered. The edge feature refers to boundary pixels between two regions of the image to be clustered. The image features may further include a color feature and a textural feature. Further, when the electronic device detects that the image to be clustered includes a face, the electronic device may extract face feature points of the image to be clustered, in which the face feature points are configured to describe a face shape, and shapes and positions of facial features.

After extracting the face feature points of the images to be clustered, the electronic device may analyze the face feature points based on a preset clustering model, divide the images to be clustered having similar face feature points into the same group, determine the group of each image to be clustered, to obtain the clustering result. With the clustering model, a similarity between images to be clustered may be computed according to the face feature points, and the images to be clustered having the similarity greater than a preset threshold may be divided into the same group. The clustering result may include image identifications and group identifications of the images to be clustered. The image identification may include information such as a name or a serial number of the image, and the group identification is configured to include the group to which the image belongs. The electronic device may add the images to be clustered into respective groups based on the clustering result, and display the images belonging to the same group in the same photo album. In at least one embodiment, after performing face recognition on the images to be clustered and extracting image features of the images to be clustered, the electronic device may perform the clustering locally through the clustering model stored locally, or may upload the image features to the server such that the server perform the clustering through the clustering model of the server, and add the images to corresponding photo albums for display according to the clustering result returned by the server.

In block 220, face information of respective images in the photo album is collected, and a face parameter of each image is acquired according to the face information.

The electronic device may collect face information of respective images in the photo album. The face information may include face feature points and position information of the face region in the image, which are obtained by the face recognition. When one image includes a plurality of faces, the image may correspond to multiple different face information. In an embodiment, the electronic device may acquire image identifications of respective images included in the photo album, and extract face information corresponding to the image identifications from the face database, in which the face database stores face recognition results of images. After performing face recognition on the images during clustering, the electronic device may store the face recognition results and the image identifications in the face database with association relationship, in which the face recognition results may include face information obtained from recognition. By directly extracting the face information of the images from the face database, the speed of selecting the cover may be enhanced. The electronic device may perform the face recognition on the images included in the photo album again when selecting the cover of the photo album, to collect the face information of images.

The electronic device may acquire the face parameter of each image according to the face information. The face parameter may be configured to describe a quality of the face, and the face parameter may be set in advance based on demands. In an embodiment, the face parameter may include, but not limited to, a face brightness, a face ratio, a face turning angle, and a face recognition credibility. The face brightness refers to a brightness value of the face region. The face ratio refers to a ratio of an area of the face region to an area of the corresponding image. The face turning angle refers to a deflection of an orientation of the recognized face with respect to the front. The face recognition credibility refers to a degree of accuracy of the face recognition. After collecting the face information, the electronic device may determine the face region according to the face information, and obtain the face parameter according to the recognized face feature points. It may be understood that, the face parameter acquired by the electronic device may include more or less than mentioned above, which is not limited.

In one embodiment, when the image in the photo album includes multiple faces, the face corresponding to the photo album is acquired, and the face information matched with the face corresponding to the photo album is collected from the image, and the face parameter is acquired according to the face information. For example, when the image in the photo album includes the face A and the face B and the face corresponding to the photo album is acquired as the face A (i.e., this photo album displays the images including the face A), the face information of the face A in the image is collected, and face parameters such as the face brightness, the face ratio, the face turning angle and the face recognition credibility of the face A in the image are acquired according to the face information.

In block 230, a cover image is selected according to the face parameter of each image.

The electronic device may select the cover image according to the face parameter of each image in the photo album. In an embodiment, a selecting strategy may be defined in advance, and the cover image may be selected according to the selecting strategy. The selecting strategy may be defined based on actual demands. For example, the selecting strategy may be defined in such a way that the images with the face brightness greater than a preset brightness threshold are selected first and then from which, the image having the greatest face ratio is selected as the cover image. The selecting strategy may also be defined in such a way that images with the face recognition credibility greater than a preset credibility threshold are selected first and then from which, the images with the face turning angle less than a preset angle threshold are selected, and finally the image having the greatest face ratio is selected as the cover image. The preset disclosure is not limited thereto.

In block 240, a face-region image is taken from the cover image and set as a cover of the photo album.

The electronic device may take the face-region image from the selected cover image and set the face-region image as the cover of the photo album. In detail, the electronic device may determine the face region of the cover image according to the face information, extract the face region from the image by means of image matting to generate the face-region image, and set the face-region image as the cover of the photo album for display.

In an embodiment, the electronic device may convert the cover image to a bitmap, which may also be referred to as a dot matrix image. The bitmap consists of pixel points. These pixels may be arranged and dyed in different ways to generate different patterns. After converting the cover image to the bitmap, the electronic device may determine the position information of the face region included by the cover image in the bitmap according to the collected face information, in which the position information includes coordinates of the pixel points. The electronic device may determine the coordinates of all the pixel points included by the face region in the bitmap. The electronic device may read image content corresponding to the position information from the bitmap, in which the image content may include color information and transparency of the pixel points. The electronic device may extract respective pixel points included by the face region in the bitmap according to the coordinates of pixel points included in the position information, and store the image content of extracted pixel points in a preset format, to obtain the face-region image. The preset format may be a picture format, such as JPG or PNG, but the present disclosure is not limited thereto. By extracting the face region from the bitmap and resaving it in the preset picture format, data amount of taking the face-region image may be reduced.

In an embodiment, when the cover image is selected may be defined. For example, when the electronic device detects change of images in the photo album, the cover of the photo album may be re-selected. The change of images in the photo album may include, but not limited to, adding new images to the photo album, deleting images in the photo album, and change of content of images in the photo album. In an embodiment, when the electronic device detects that a new image is added to the photo album, the electronic device may collect face information of the new image, and acquire the face parameter of the new image according to the face information, and may compare the face parameter of the new image with that of the current cover image of the photo album, to determine whether to change the cover of the photo album. In an embodiment, when the electronic device detects that an image in the photo album is deleted, the electronic device may determine whether the deleted image is the cover image of the photo album. If the deleted image is not the cover image, the electronic device may not re-select the cover. If the deleted image is the cover image, the electronic device may re-select the cover image from the images currently included in the photo album.

In this embodiment, the photo album obtained from face clustering is acquired, the face information of respective images in the photo album is collected, the face parameter of each image is acquired according to the face information, the cover image is selected according to the face parameter of each image, the face-region image is taken from the cover image, and the face-region image is set as the cover of the photo album. The cover of the photo album is selected from multiple dimensions, such that the cover with a better quality may be selected for the photo album, improving the display effect of the photo album.

Figure 5:
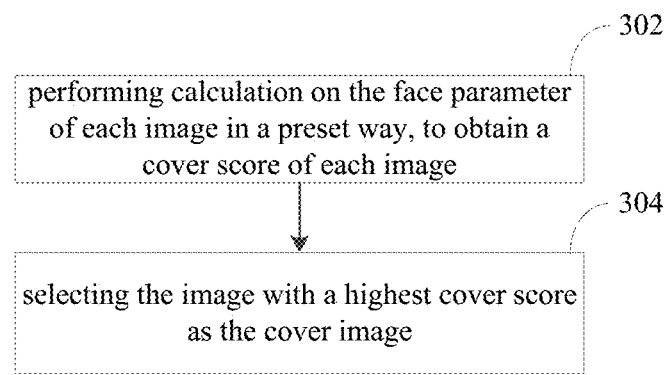
FIG. 5 is a flow chart of selecting a cover image according to a face parameter in an embodiment.

As illustrated in FIG. 5, in an embodiment, the cover image may be selected according to the face parameter of each image as follows.

In block 302, calculation may be performed based on the face parameter of each image in a preset manner to obtain a cover score of each image.

The electronic device may perform calculation on the face parameter of each image in a preset manner to obtain the cover score of each image, in which the cover score may be configured to evaluate a quality of the face. In an embodiment, the electronic device may set a correspondence relationship between parameters and scores, and converts the face parameter to the corresponding score according to the correspondence relationship between parameters and scores. The correspondence relationship may be a specific relation formula, for example, the face turning angle and the score may have a negative linear relationship, i.e., the greater the face turning angle is, the smaller the score is. The correspondence relationship may also be an interval-to-single value relationship. The electronic device may divide parameter intervals of the face parameter in advance. Different parameter intervals may correspond to different parameter ranges, and each parameter interval may correspond to one score. For example, the face ratio may be divided into 5 intervals, which are [0, 20%], [20%, 40%], [40%, 60%], [60%, 80%] and [80%, 100%], in which the interval [0, 20%] may correspond to the score of 20, the interval [20%, 40%] may correspond to the score of 40, the interval [40%, 60%] may correspond to the score of 60, the interval [60%, 80%] may correspond to the score of 80, and the interval [80%, 100%] may correspond to the score of 100. However, the present disclosure is not limited to this. After converting the face parameter to the corresponding score, the electronic device may calculate the cover score. In an embodiment, the electronic device may obtain a plurality of face parameters, and after converting the plurality of face parameters to corresponding scores, the electronic device may add or multiply these scores to obtain the cover score. The electronic device may also set a weight for each face parameter, and calculate the cover score by weighting and summing. The present disclosure is not limited to this.

In block 304, the image with a highest cover score is set as the cover image.

After calculating the cover scores of respective images in the photo album, the electronic device may select the image with the highest cover score as the cover image.

In an embodiment, image sources of respective images may be acquired, and the image with the highest cover score may be selected from the images coming from a preset source and set as the cover image.

The electronic device may acquire image sources of respective images in the photo album. The image sources may include, but not limited to, the camera of the electronic device, another electronic device, and the server. Different image sources may correspond to different source identifications. The source identification may consist of one or more kinds of characters such as symbols, numbers and letters. For example, the source identification corresponding to the image coming from the camera of the electronic device is 0, the source identification corresponding to the image received from another electronic device is 1, and the source identification corresponding to the image download from the server is 2. However, the present disclosure is not limited to this. The electronic device may acquire the corresponding source identification according to the image identification of each image in the photo album, and determine the image source according to the source identification.

The electronic device may select the images satisfying the preset source from the images in the photo album, and from which, select the image with the highest cover score as the cover image. In this embodiment, the preset source may be the camera of the electronic device, and the image with the highest cover score may be selected among the images captured by the camera of the mobile and set as the cover image. The image captured by the camera of the electronic device may be given priority to be selected as the cover image, such that the selected cover image may joint user requirements better, improving the display effect of the photo album. It may be understood, the preset source may be any other source, which is not limited. In an embodiment, after selecting the image with the highest cover score from the images whose image sources satisfy the preset source, the electronic device may determine whether the highest cover score is less than a preset score. If the highest cover score of the selected image is less than the preset score, the electronic device may not use the image as the cover image, and select the image with the highest cover score from other images coming from other sources and use the re-selected image as the cover image, thus avoiding that the face quality of the selected image is too low.

Figure 6:
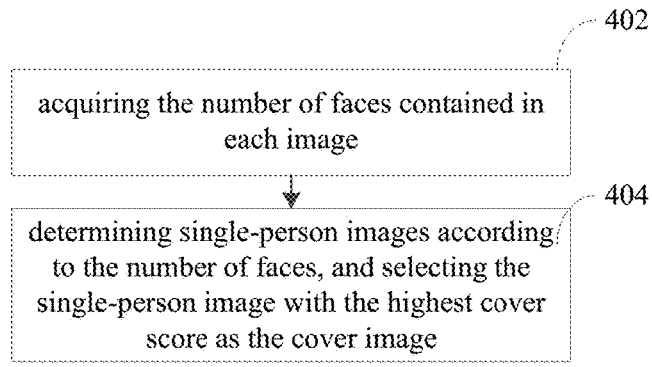
FIG. 6 is a flow chart of selecting a cover image according to a face parameter in another embodiment.

As illustrated in FIG. 6, in an embodiment, the image with the highest cover score may be selected as follows.

In block 402, the number of faces included in each image is acquired.

In block 404, single-person images are determined according to the number of faces, and the image with the highest cover score is selected from the single-person images and used as the cover image.

The electronic device may acquire the number of faces included in each image of the photo album. The number of faces may be determined from the collected face information, each copy of face information correspond to one face. The electronic device may determine the single-person images according to the number of faces, i.e., select the images each including one face from the photo album, and select the image with the highest cover score from the single-person images as the cover image. In an embodiment, if there is no single-person image in the photo album, the electronic device selects the image with the highest cover score sequentially from different groups of images whose number of faces are in an order from small to large. For example, the electronic device may first select the single-person images. When there is no single-person image, the electronic device may select the image with the highest cover score from the images including 2 faces as the cover image. When there is no image including 2 faces, the electronic device may select the image with the highest cover score from the images including 3 faces as the cover image, and so on. In an embodiment, the electronic device may also first acquire images with the lowest number of faces in the photo album, and select the image with the highest cover score from the images with the lowest number of faces as the cover image.

In an embodiment, the number of faces may be used as a parameter for calculating the cover score. The cover score of the image is calculated according to the face parameter together with the number of faces in a preset manner. In an embodiment, the electronic device may establish a correspondence relationship between the number of faces and the score. The number of faces may have a negative relationship with the score. The greater the number of faces is, the smaller the score is. The electronic device may first calculate an initial cover score according to the face parameter and then divide the initial cover score by the number of faces to obtain the cover score of the image. The cover score may be calculated in other ways, which is not limited.

In this embodiment, the single-person image is given priority to be selected as the cover image, which avoids a situation in which the cover of the photo album includes other face, ensures that the cover with a better quality may be selected for the photo album, and improves the display effect of the photo album.

Figure 7:
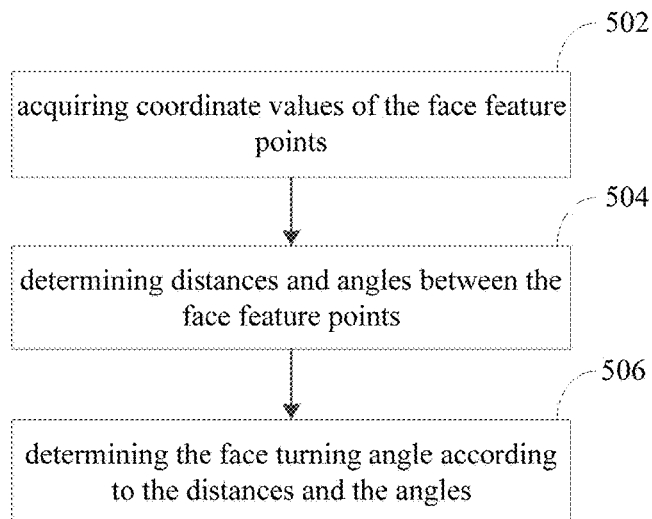
FIG. 7 is a flow chart of acquiring a face parameter according to face information in an embodiment.

As illustrated in FIG. 7, in an embodiment, the face parameter may be determined according to the face information as follows.

In block 502, coordinate values of face feature points are acquired.

The electronic device may acquire face information of respective images in the photo album. The face information may include face feature points obtained from face recognition, and each face feature point may have the coordinate value. The coordinate value of the face feature point may be represented by the pixel position corresponding to the feature point, for example, the coordinate value of the feature point is line X, column Y of the corresponding pixel position.

In block 504, a distance and an angle between two face feature points are calculated according to the coordinate values.

The electronic device may calculate the distance and angle between two face feature points are calculated according to the coordinate values. There may be a plurality of face feature points in the face region of the image, and the electronic device may calculate the distance and angle between each two face feature points. In an embodiment, one face feature point may correspond to a plurality of pixel points in the image, and the electronic device may select the pixel point at the center as a basis point to calculate the distance and angle between face feature points. For example, the feature point at the left canthus of the eye corresponds to pixel points from line 100 to line 110 and from column 100 to column 110, and the electronic device selects the pixel point at line 105 and column 105 as the basis point of the feature point.

The electronic device may represent the distance between face feature points as the number of pixel points. For example, the distance between the feature point at the left canthus and the feature point at the right canthus includes 0.3 million pixel points. The electronic device may establish a rectangular coordinate system, and calculates the angle between face feature points in the rectangular coordinate system. The electronic device may establish the rectangular coordinate system on the image with two straight lines crossing at the right angle, and specify a positive direction and a negative direction for each straight line. After acquiring a line segment connected between basis points corresponding to two face feature points, the electronic device may acquire two acute angels formed by the line segment and the two straight lines of the coordinate system, which represent the angle between the two face feature points. For example, the electronic device establishes the XY coordinate system on the image with two straight lines perpendicular to each other, and divides the X-axis into a positive axis and a negative axis, and divides the Y-axis into a positive axis and a negative axis. The electronic device connects the feature point of the right canthus with the feature point of the left canthus to form a line segment, and calculates that the angle between the line segment and the positive axis of X-axis is 80 degree, and the angle between the line segment and the positive axis of Y-axis is 10 degree. Then, the angle between the feature point of the right canthus and the feature point of the left canthus in the face region may include 80 degree from the positive axis of X-axis and 10 degree from the positive axis of Y-axis.

In block 506, the face turning angle is determined according to the distances and angles between face feature points.

After acquiring the distances and angles between face feature points of the face region, the electronic device may determine the face turning angle according to the distances and angles between face feature points. In an embodiment, the electronic device may analyze the distances and angles between face feature points based on a preset turning model to determine the angle turning angle, in which the turning model may be constructed by machine learning. The face turning angle may be understood as a rotation angle of the face region in the image with respect to a standard face, in which the standard face may be an image captured when the face is directly in front of the camera. The face turning angle may be represented by three angles. Three straight lines perpendicular to each other cross at one point in the three-dimensional space to form a three-dimensional coordinate system. Each two of the three straight lines form a plane, thus forming three planes. The rotation angels of the face region with respect to the standard face in three planes may be represented as the face turning angle.

In this embodiment, the face turning angle of the image may be determined according to coordinates of face feature points, such that the face parameter may be more accurate, which facilitates to select the cover with the better quality for the photo album, and improves the display effect of the photo album.

In an embodiment, determining the face parameter of the image according to the face information may include determining the face region of the image according to the face information and calculating a ratio of an area of the face region to an area of the image to obtain the face ratio.

The electronic device may acquire the position information of the face region in the image according to the face information, and determine the face region of the image according to the position information. The face region may be square or rectangular. The electronic device may calculate the area of the face region, and divide the area of the face region by the area of the whole image to obtain the face ratio.

In an embodiment, when the image includes a plurality of faces, the electronic device may acquire the face corresponding to the photo album, and collect face information matched with face corresponding to the photo album from the image. After determining the face region in the image according to the face information matched with the face corresponding to the photo album, the electronic device may determine whether the face region includes other faces, if yes, subtract the area occupied by the other faces from the area of the face region to obtain a remaining area and divide the remaining area by the area of the whole image to obtain the face ratio.

In this embodiment, the face ratio may be calculated according to the area of the face region, such that the obtained face parameter is more accurate, which facilitates to select the cover with better quality for the photo album, and improves the display effect of the photo album.

In an embodiment, an image processing method is provided. The method may include:

acquiring a photo album obtained from face clustering;

collecting face information of respective images in the photo album, and acquiring a face parameter of each image according to the face information;

selecting a cover image according to the face parameter of each image; and taking a face-region image from the cover image, and setting the face-region image as a cover of the photo album.

In an embodiment, collecting face information of respective images in the photo album includes: acquiring image identifications of images in the photo album; extracting face information corresponding to the image identifications from a face database, the face database being stored with face recognition results of images.

In an embodiment, the face information includes face feature points, and the face parameter includes a face turning angle. Acquiring the face parameter of each image according to the face information includes: acquiring coordinate values of the face feature points; determining distances and angles between the face feature points; and determining the face turning angle according to the distances and the angles.

In an embodiment, the face parameter includes a face ratio; acquiring the face parameter of each image according to the face information comprises: determining the face region of the image according to the face information; and calculating a ratio of an area of the face region to an area of the image to obtain the face ratio.

In an embodiment, selecting the cover image according to the face parameter of each image includes: performing calculation on the face parameter of each image in a preset way, to obtain a cover score of each image; and selecting the image with a highest cover score as the cover image.

In an embodiment, selecting the image with a highest cover score as the cover image includes: acquiring a source of each image; and selecting the image with the highest cover score in images coming from a preset source as the cover image.

In an embodiment, selecting the image with a highest cover score as the cover image includes: acquiring the number of faces contained in each image; determining single-person images according to the number of faces; and selecting the single-person image with the highest cover score as the cover image.

In this embodiment, the photo album obtained from face clustering is acquired, the face information of respective images in the photo album is collected, the face parameter of each image is acquired according to the face information, the cover image is selected according to the face parameter of each image, the face-region image is taken from the cover image, and the face-region image is set as the cover of the photo album. The cover of the photo album is selected from multiple dimensions, such that the cover with a better quality may be selected for the photo album, improving the display effect of the photo album.

Figure 8:
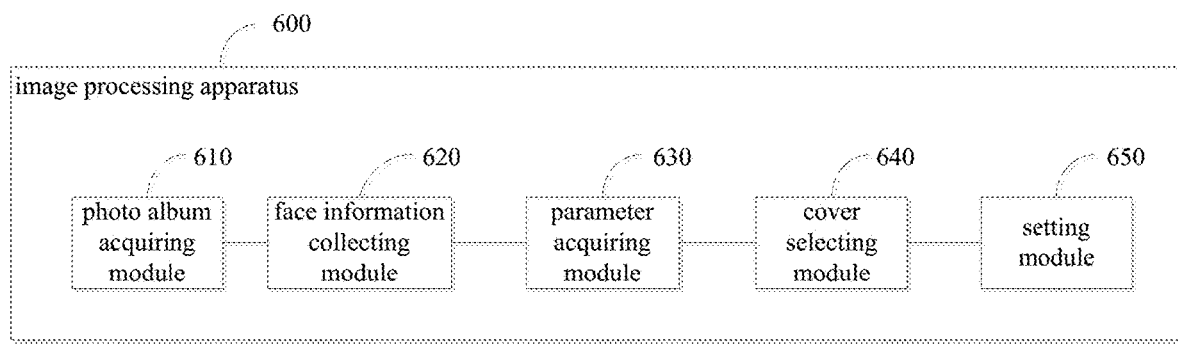
FIG. 8 is a block diagram of an image processing apparatus in an embodiment.

In an embodiment, an image processing apparatus 600 is provided. As illustrated in FIG. 8, the image processing apparatus 600 includes a photo album acquiring module 610, a face information collecting module 620, a parameter acquiring module 630, a cover selecting module 640 and a setting module 650.

The photo album acquiring module 610 is configured to acquire a photo album obtained from face clustering.

The face information collecting module 620 is configured to collect face information of images in the photo album.

In an embodiment, the face information collecting module 620 is further configured to acquire image identifications included in the photo album and extract the face information corresponding to the image identifications from a face database, in which the face database is stored with face recognition results of images.

The parameter acquiring module 630 is configured to acquire a face parameter of each image according to the face information.

The cover selecting module 640 is configured to select a cover image according to the face parameter of each image.

The setting module 650 is configured to take a face-region image from the cover image, and set the face-region image as a cover of the photo album.

In this embodiment, the photo album obtained from face clustering is acquired, the face information of respective images in the photo album is collected, the face parameter of each image is acquired according to the face information, the cover image is selected according to the face parameter of each image, the face-region image is taken from the cover image, and the face-region image is set as the cover of the photo album. The cover of the photo album is selected from multiple dimensions, such that the cover with a better quality may be selected for the photo album, improving the display effect of the photo album.

Figure 9:
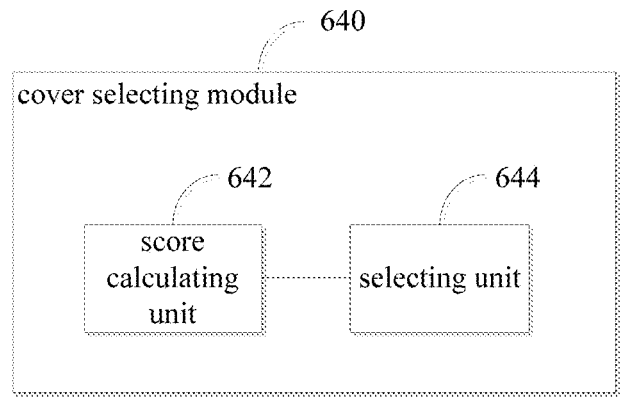
FIG. 9 is a block diagram of a cover selecting module in an embodiment.

As illustrated in FIG. 9, in an embodiment, the cover selecting module 640 includes a score calculating unit 642 and a selecting unit 644.

The score calculating unit 642 is configured to perform calculation on the face parameter of each image in a preset way to obtain a cover score of each image.

The selecting unit 644 is configured to select the image with a highest cover score as the cover image.

In an embodiment, the selecting unit 644 is further configured to acquire image sources of respective images, and select the image with the highest cover score from the images whose image sources satisfy a preset source as the cover image.

In this embodiment, the cover scores of images may be calculated according to the face parameters to quantify and select the cover image, such that the selected cover image has a better quality, which improves the display effect of the photo album.

In an embodiment, the selecting unit 644 may include a number acquiring sub-unit and a selecting sub-unit.

The number acquiring sub-unit is configured to acquire the number of faces included in each image.

The selecting sub-unit is configured to determine single-person images according to the number of faces, and select the image with the highest cover score from the single-person images as the cover image.

In this embodiment, the single-person image is given priority to be selected as the cover image, which avoids that the cover of the photo album includes other faces, provides the cover with better quality for the photo album, and improves the display effect of the photo album.

In an embodiment, the face information includes face feature points, and the face parameter includes a face turning angle. The parameter acquiring module 630 includes a coordinate acquiring unit, an angle calculating unit and a determining unit.

The coordinate acquiring unit is configured to acquire coordinate values of the face feature points.

The angle calculating unit is configured to calculate distances and angles between face feature points according to the coordinate values.

The determining unit is configured to determine the face turning angle according to the distances and angles.

In this embodiment, the face turning angle of the image may be determined according to the coordinate values of face feature points, such that the face parameter acquired may be more accurate, which facilitates to select the cover with better quality for the photo album, and improves the display effect of the photo album.

In an embodiment, the face parameter includes a face ratio. The parameter acquiring module 630 further includes a face determining unit and a ratio calculating unit besides the coordinate acquiring unit, the angle calculating unit and the determining unit.

The face determining unit is configured to determine a face region of the image according to the face information.

The ratio calculating unit is configured to calculate a ratio of an area of the face region to an area of the corresponding image, to obtain the face ratio.

In this embodiment, the face ratio may be calculated according to the area of the face region, such that the face parameter acquired may be more accurate, which facilitates to select the cover with better quality for the photo album, and improves the display effect of the photo album.

Figure 10:
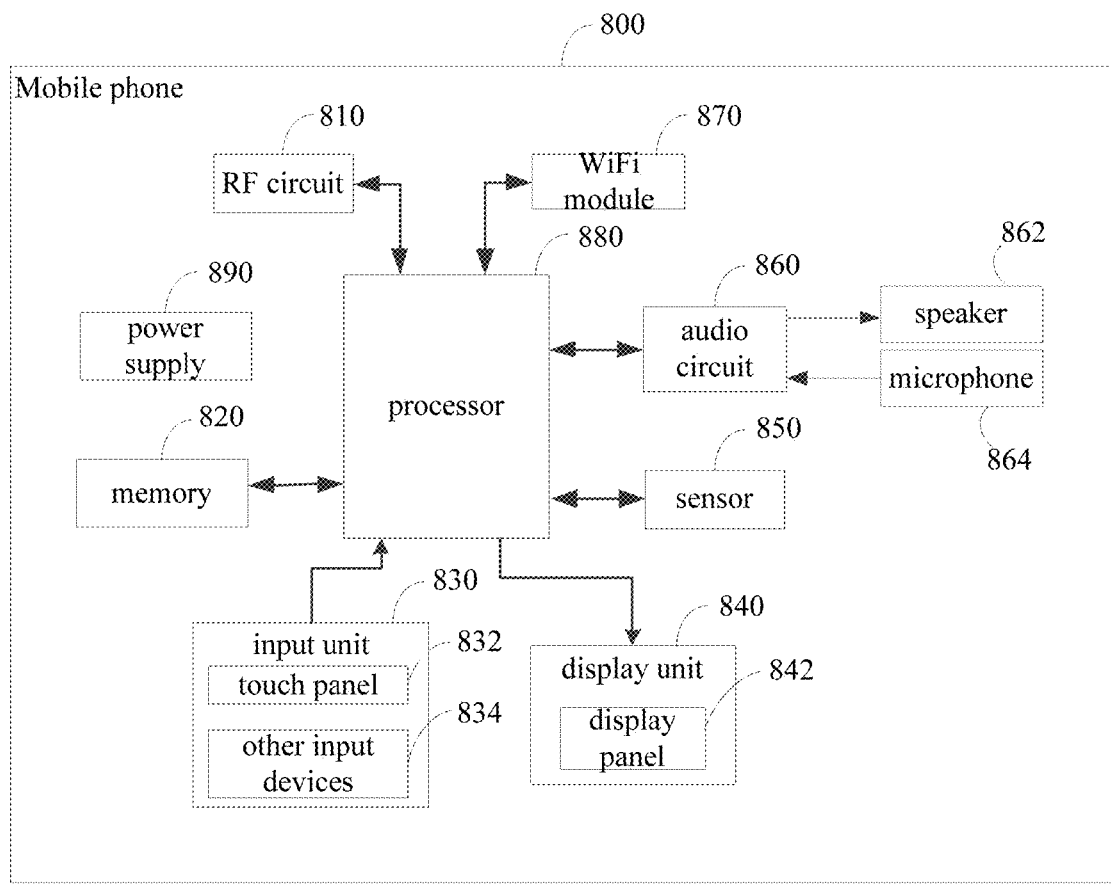
FIG. 10 is a block diagram of an electronic device in another embodiment.

Embodiments of the present disclosure also provide an electronic device. As illustrated in FIG. 10, for the convenience of description, only parts related to the embodiments of the present disclosure are illustrated. Details that are not disclosed may refer to the method embodiments of the present disclosure. The electronic device may be any terminal device including a mobile phone, a tablet computer, a PDA (personal digital assistant), a point of sales (POS), an in-vehicle computer, and the like. The electronic device being a mobile phone is taken as an example.

FIG. 10 is a block diagram illustrating a partial structure of a mobile phone related to an electronic device provided by an embodiment of the present disclosure. Referring to FIG. 8, the mobile phone includes: a radio frequency (RF) circuit 810, a memory 820, an input unit 830, a display unit 840, a sensor 850, an audio circuit 860, a wireless fidelity (Wi-Fi) module 870, processor 880, a power supply 890 and other components. It will be understood by those skilled in the art that the structure of the mobile phone illustrated in FIG. 8 does not constitute a limitation to the mobile phone, and may include more or less components than those illustrated, or some components may be combined, or the components may be arranged differently.

The RF circuit 810 may be configured to receive and to transmit signals during information receiving and transmitting or calling, which may receive downlink information of base station and forward the information the processor 880 for processing, and send uplink data to the base station. Generally, RF circuit 810 includes, but is not limited to, an antenna, at least one amplifier, a transceiver, a coupler, a low noise amplifier (LNA), a duplexer, and the like. In addition, the RF circuitry 810 may also communicate with the network and other devices via wireless communication. The above wireless communication may use any communication standard or protocol, including but not limited to global system of mobile communication (GSM), general packet radio service (GPRS), code division multiple access (code division). Multiple access (CDMA), wide band code division multiple access (WCDMA), Long Term Evolution (LTE), e-mail, short messaging service (SMS), and the like.

The memory 820 may be configured to store software programs and modules, and the processor 880 executes various functional applications and data processing of the mobile phone by running software programs and modules stored in the memory 820. The memory 820 may mainly include a program storage area and a data storage area, in which the program storage area may store an operating system, an application required for at least one function, and the like; the data storage area may store data created according to usage of the mobile phone, and the like. Moreover, the memory 820 may include a high speed random access memory, and may also include a non-volatile memory, such as at least one magnetic disk storage device, flash memory device, or other volatile solid state storage device.

The input unit 830 may be configured to receive inputted numeric or character information and to generate key signal inputs related to user settings and function controls of the mobile phone. Specifically, the input unit 830 may include a touch panel 832 and other input devices 834. The touch panel 832 may also be referred to as a touch screen, which may collect touch operations of a user thereon or nearby (for example, the operation operated by the user with a finger or any suitable object or accessory such as a touch pen), and drive corresponding connected device according to preset programs. In an embodiment, the touch panel 832 may include a touch detecting device and a touch controller. The touch detecting device detects a touch position of the user, and detects a signal brought by the touch operation, and transmits the signal to the touch controller. The touch controller receives touch information from the touch detecting device, and converts it to the touch coordinate, and transmits the touch coordinate to the processor 880, and can receive the instruction sent from the processor 880 and perform corresponding operation according to the instruction. In addition, the touch panel 832 may be implemented in a resistance-type, a capacitance-type, a infrared ray-type or a SAW (surface acoustic wave) type. The input unit 830 may also include other input devices 834 besides the touch panel 832. Specifically, other input devices 834 may include, but are not limited to, one or more of a physical keyboard and a function key (such as a volume control button, a switch button, etc.).

The display unit 840 may be configured to display information inputted by the user or information provided to the user and various menus of the mobile phone. The display unit 840 may include a display panel 842. In an embodiment, the display panel 842 may be configured in the form of a liquid crystal display (LCD), an organic light-emitting diode (OLED) and the like. In an embodiment, the touch panel 832 may cover the display panel 842. When the touch panel 832 detects the touch operation thereon or nearby, the touch panel 832 transmits it to the processor 880 for determining a type of the touch event. Then, the processor 880 provides corresponding visual output on the display panel 842 according to the type of the touch event. Although the touch panel 832 and the display panel 842 are illustrated as two separate components for implement input and output functions of the mobile phone in FIG. 8, in some embodiment, the display panel 842 and the touch panel 832 may be integrated together to implement the output and input function of the mobile phone.

The mobile phone 800 may also include at least one type of sensor 850, such as a light sensor, a motion sensor, and other sensors. Specifically, the light sensor may include an ambient light sensor and a proximity sensor, in which the ambient light sensor may adjust the brightness of the display panel 842 according to the brightness of the ambient light, and the proximity sensor may turn off the display panel 842 and/or the backlight when the mobile phone moves towards the ear. As a kind of motion sensor, the accelerometer sensor may detect the acceleration in each direction, and may detect the magnitude and direction of gravity when the sensor is static, and may be configured for applications identifying the gesture of the mobile phone (such as horizontal and vertical screen switching) and vibration recognition related functions (such as pedometer, tapping) and the like. Other sensors such as a gyroscope, barometers, a hygrometer, a thermometer, an infrared sensor, etc. may be configured on the mobile phone, which will not be described herein.

The audio circuit 860, the speaker 862, and the microphone 864 may provide an audio interface between the user and the mobile phone. The converted electrical signal of the received audio data may be transmitted by the audio circuit 860 to the speaker 862, and then converted to the sound signal output by the speaker 862. On the other hand, the collected sound signal may be converted by the microphone 864 to an electrical signal, which is received and converted to audio data by the audio circuit 860, and then the audio data is processed by the 880 and sent to another mobile phone via the RF circuit 810, or the audio data is outputted to the memory 820 for subsequent processing.

Wi-Fi is a short-range wireless transmission technology. The mobile phone may help users to send and receive an e-mail, to browse a web page and to access streaming media via the Wi-Fi module 870. It provides users with wireless broadband Internet access. Although the Wi-Fi module 870 is illustrated in FIG. 8, it may be understood that it does not belong to an essential configuration of the mobile phone, and may be omitted as needed.

The processor 880 is the control center of the mobile phone, is connected with various portions of the entire mobile phone via various interfaces and lines, performs various functions of the mobile phone and processes data by running or executing software programs and/or modules stored in the memory 820, and by invoking data stored in the memory 820, so as to monitor the entire mobile phone. In an embodiment, the processor 880 may include one or more processing units. In an embodiment, the processor 880 may integrate an application processor and a modem, in which the application processor mainly processes the operating system, the user interfaces, and applications, and the like. The modem mainly processes wireless communications. It will be appreciated that the above described modem may not be integrated into the processor 880. For example, the processor 880 may integrate the application processor and a baseband processor, in which the modem may be formed by the baseband processor together with other peripheral chips. The mobile phone also includes a power supply 890 (such as a battery) for providing power to various components. Preferably, the power supply can be logically coupled to the processor 880 via a power management system, such that charging management, discharging management, and power management can be implemented by the power management system.

In an embodiment, the mobile phone 800 may also include a camera, a Bluetooth module and the like.

In embodiments of the present disclosure, the processor 880 of the mobile phone implements the image processing method described above when executing the computer programs stored in the memory.

In an embodiment, the mobile phone may include the memory 820 and the processor 880. The memory 820 is stored with computer programs. When the computer programs are executed by the processor 880, the processor implements:

acquiring a photo album obtained from face clustering;

collecting face information of respective images in the photo album, and acquiring a face parameter of each image according to the face information;

selecting a cover image according to the face parameter of each image; and taking a face-region image from the cover image, and setting the face-region image as a cover of the photo album.

In an embodiment, a computer readable storage medium is provided. The storage medium is stored with computer programs that, when executed by the processor, implement the above image processing method.

In an embodiment, a computer program product including computer programs is provided. When the computer program product is running on a computer device, the computer device is caused to implement the above image processing method.

Ordinary skilled in the art may understand, all or part of procedure in the above method embodiments may be implemented by the computer programs instructing hardware. The programs may be stored in a non-volatile computer readable storage medium. When the programs are executed, procedure as above method methods may be included. The storage medium may be a disk, a CD, a ROM (Read-Only Memory) and the like.

Any reference to the memory, the storage, the database, or any other medium as used herein may include a non-volatile memory and/or a volatile memory. The suitable non-volatile memory may include a ROM, a programmable ROM (PROM), an electrically programmable (EPROM), an electrically erasable programmable ROM (EEPROM) and a flash memory. The volatile memory may include a RAM, which is used as an external cache. As illustration and without limitation, RAM may be implemented in may forms, such as static RAM (SRAM), dynamic RAM (DRAM), synchronic DRAM (SDRAM), double data rate SDRAM (DDR SDRAM), enhanced SDRAM (ESDRAM), synchlink DRAM (SLDRAM), memory bus (Rambus), direct RAM (RDRAM), direct memory bus dynamic RAM (DRDRAM), and memory bus dynamic RAM (RDRAM).

Various technical features of embodiments described above may be combined arbitrarily. For simplicity of description, not all the possible combinations of various technical features in the above embodiments are described. Any combination of these technical features should fall in the scope of the present disclosure, as long as there is no contradiction.

Above embodiments merely illustrate some implementations of the present disclosure, which are described specifically and in detail, but do not constitute limitation to the scope of the present disclosure. It is to be noted that, those skilled in the art may make several modification and change without departing from the concept of the present disclosure, and these modification and change belong to the protection scope of the present disclosure. Thus, the protection scope of the present disclosure is defined by appending claims.

What is claimed is:

1. An image processing method, comprising:

acquiring a photo album obtained from face clustering;

collecting face information of respective images in the photo album, and acquiring a face parameter of each image according to the face information;

selecting a cover image according to the face parameter of each image; and taking a face-region image from the cover image, and setting the face-region image as a cover of the photo album;

wherein selecting the cover image according to the face parameter of each image comprises:

performing calculation on the face parameter of each image in a preset way, to obtain a cover score of each image; selecting the image with a highest cover score as the cover image;

wherein selecting the image with the highest cover score as the cover image comprises:

acquiring a source of each image; and selecting the image with the highest cover score in images coming from a preset source as the cover image.

2. The method according to claim 1, wherein selecting the image with the highest cover score as the cover image comprises:

acquiring the number of faces contained in each image;

determining single-person images according to the number of faces; and selecting the single-person image with the highest cover score as the cover image.

3. The method according to claim 2, wherein selecting the image with the highest cover score as the cover image further comprises:

when there is no single-person image in the photo album, determining images including two faces from the photo album; and selecting the image with the highest cover score from the images including two faces as the cover image.

4. The method according to claim 1, wherein the face information comprises face feature points, and the face parameter comprises a face turning angle;

acquiring the face parameter of each image according to the face information comprises:
  acquiring coordinate values of the face feature points;
  determining distances and angles between the face feature points; and
  determining the face turning angle according to the distances and the angles.

5. The method according to claim 1, wherein the face parameter comprises a face ratio;
acquiring the face parameter of each image according to the face information comprises:
  determining a face region of the image according to the face information; and
  calculating a ratio of an area of the face region to an area of the image to obtain the face ratio.

6. The method according to claim 5, wherein calculating the face ratio comprises:
  when there is more than one face in the image, subtracting an area occupied faces other than a face corresponding to the photo album from the face region to obtain a remaining area; and
  calculating a ratio of the remaining area to the area of the image to obtain the face ratio.

7. The method according to claim 1, wherein collecting face information of respective images in the photo album comprises:
  acquiring image identifications of images in the photo album;
  extracting face information corresponding to the image identifications from a face database, the face database being stored with face recognition results of images, the face recognition results including the face information.

8. An image processing apparatus, comprising:
  a processor; and
  a memory, configured to store instructions executable by the processor,
  wherein the processor is configured to run a program corresponding to the instructions by reading the instructions stored in the memory, so as to perform:
    acquiring a photo album obtained from face clustering;
    collecting face information of each image in the photo album;
    acquiring a face parameter of each image according to the face information;
    selecting a cover image according to the face parameter of each image;
    taking a face-region image from the cover image, and setting the face-region image as a cover of the photo album;
  wherein the processor is configured to: perform calculation on the face parameter of each image in a preset way, to obtain a cover score of each image; and select the image with a highest cover score as the cover image; and
  wherein the processor is configured to: acquire a source of each image; and select the image with the highest cover score in images coming from a preset source as the cover image.

9. The apparatus according to claim 8, wherein the processor is configured to:
  acquire the number of faces contained in each image;
  determine single-person images according to the number of faces; and
  select the single-person image with the highest cover score as the cover image.

10. The apparatus according to claim 9, wherein the processor is further configured to:
  when there is no single-person image in the photo album, determine images including two faces from the photo album; and
  select the image with the highest cover score from the images including two faces as the cover image.

11. The apparatus according to claim 8, wherein the face information comprises face feature points, and the face parameter comprises a face turning angle;
the processor is configured to:
  acquire coordinate values of the face feature points;
  determine distances and angles between the face feature points; and
  determine the face turning angle according to the distances and the angles.

12. The apparatus according to claim 8, wherein the face parameter comprises a face ratio;
the processor is configured to:
  determine a face region of the image according to the face information; and
  calculate a ratio of an area of the face region to an area of the image to obtain the face ratio.

13. The apparatus according to claim 12, wherein the processor is configured to:
  when there is more than one face in the image, subtract an area occupied faces other than a face corresponding to the photo album from the face region to obtain a remaining area; and
  calculate a ratio of the remaining area to the area of the image to obtain the face ratio.

14. The apparatus according to claim 8, wherein the processor is configured to:
  acquire image identifications of images in the photo album;
  extract face information corresponding to the image identifications from a face database, the face database being stored with face recognition results of images, the face recognition results including the face information.

15. An electronic device, comprising a processor, a memory, a display screen and an input device connected via a system bus, wherein the memory is stored with computer programs that, when executed by the processor, cause the processor to implement an image processing method, the image processing method comprising:
  acquiring a photo album obtained from face clustering;
  collecting face information of respective images in the photo album, and acquiring a face parameter of each image according to the face information;
  selecting a cover image according to the face parameter of each image; and
  taking a face-region image from the cover image, and setting the face-region image as a cover of the photo album;
  wherein selecting the cover image according to the face parameter of each image comprises:
    performing calculation on the face parameter of each image in a preset way, to obtain a cover score of each image; and selecting the image with a highest cover score as the cover image; and
  wherein selecting the image with the highest cover score as the cover image comprises:
    acquiring a source of each image; and selecting the image with the highest cover score in images coming from a preset source as the cover image.

16. The electronic device according to claim 15, wherein the electronic device comprises at least one of a mobile phone, a tablet computer, a personal digital assistant and a wearable device.

\* \* \* \* \*